United States Patent
Ezra et al.

(10) Patent No.: US 9,195,387 B2
(45) Date of Patent: Nov. 24, 2015

(54) SEPARATING A CURSOR WHEN A TOUCH SELECTION CONTINUES FROM A FIRST TO SECOND SCREEN

(75) Inventors: Dean Ezra, Berkshire (GB); Robert Duxbury, Berkshire (GB)

(73) Assignee: NEC CORPORATION, Tokyo (JP)

( * ) Notice: Subject to any disclaimer, the term of this patent is extended or adjusted under 35 U.S.C. 154(b) by 237 days.

(21) Appl. No.: 13/823,091

(22) PCT Filed: Oct. 5, 2011

(86) PCT No.: PCT/JP2011/073469
§ 371 (c)(1),
(2), (4) Date: May 1, 2013

(87) PCT Pub. No.: WO2012/073598
PCT Pub. Date: Jun. 7, 2012

(65) Prior Publication Data
US 2013/0300661 A1    Nov. 14, 2013

(30) Foreign Application Priority Data

Nov. 29, 2010 (GB) .................................. 1020177.0

(51) Int. Cl.
| | |
|---|---|
| *G06F 3/041* | (2006.01) |
| *G06F 3/0481* | (2013.01) |
| *G06F 3/0488* | (2013.01) |
| *G06F 1/16* | (2006.01) |
| *G06F 3/0484* | (2013.01) |
| *G06F 17/24* | (2006.01) |

(52) U.S. Cl.
CPC ............ *G06F 3/0488* (2013.01); *G06F 1/1643* (2013.01); *G06F 1/1647* (2013.01); *G06F 3/041* (2013.01); *G06F 3/0481* (2013.01); *G06F 3/04812* (2013.01); *G06F 3/04842* (2013.01); *G06F 3/04883* (2013.01); *G06F 17/24* (2013.01)

(58) Field of Classification Search
None
See application file for complete search history.

(56) References Cited

U.S. PATENT DOCUMENTS

| | | | |
|---|---|---|---|
| 5,663,748 A | 9/1997 | Huffman et al. | |
| 6,252,563 B1 * | 6/2001 | Tada et al. | 345/1.1 |

(Continued)

FOREIGN PATENT DOCUMENTS

| | | | |
|---|---|---|---|
| JP | 2000-242393 A | | 9/2000 |
| JP | 2000-242393 | * | 9/2008 |
| JP | 2010-184009 A | | 8/2010 |
| WO | WO2010/028406 A1 | | 3/2010 |

OTHER PUBLICATIONS

European Search Report dated Apr. 2, 2014.

(Continued)

*Primary Examiner* — Quan-Zhen Wang
*Assistant Examiner* — Chad Dicke
(74) *Attorney, Agent, or Firm* — McGinn IP Law Group, PLLC.

(57) ABSTRACT

The present invention provides for a touch-sensitive electronic device having at least first and second touch screens, interface control means for touch selection of content displayed on the screens and wherein the interface control means is arranged such that as touch-selection on the first screen reaches an end location, the selected portion of content is saved and touch-selection functionality is arranged to continue at a start location on the second screen, and also provides for a related method allowing for touch selection of content extending across both screens so that such content can be selected in a unitary manner.

21 Claims, 5 Drawing Sheets

(56) References Cited

U.S. PATENT DOCUMENTS

| | | |
|---|---|---|
| 6,331,840 B1 | 12/2001 | Nielson et al. |
| 2002/0059350 A1* | 5/2002 | Iwema et al. ............... 707/530 |
| 2002/0097270 A1 | 7/2002 | Keely et al. |
| 2007/0124503 A1 | 5/2007 | Ramos et al. |
| 2009/0193351 A1 | 7/2009 | Lee et al. |
| 2010/0066643 A1* | 3/2010 | King et al. ................ 345/1.3 |
| 2010/0201645 A1 | 8/2010 | Asami |

OTHER PUBLICATIONS

International Search Report in PCT/JP2011/073469 dated Nov. 8, 2011 (English Translation Thereof).

Written Opinion of the ISA in PCT/JP2011/073769 dated Nov. 8, 2011.

Great Britain Search Report in GB 1020177.0 dated Feb. 23, 2011.

* cited by examiner

SEPARATING A CURSOR WHEN A TOUCH SELECTION CONTINUES FROM A FIRST TO SECOND SCREEN

PRIORITY CLAIM

Priority is claimed on United Kingdom Patent Application No. 1020177.0, filed Nov. 29, 2010, the content of which is incorporated herein by reference.

TECHNICAL FIELD

The present invention relates to a touch-sensitive electronic device and to a method of operating the same, and in particular to a multi touch-screen device and related method.

BACKGROUND ART

To meet various requirements such as ease of user operability and reduction in device size, electronic devices comprising display screens are commonly also arranged to employ such screens as part of a user-input interface. One and the same screen can therefore be arranged as a user input means and display means. In some circumstances such a touch sensitive display will be arranged to display the representation of standard input interface such as for example a QWERTY keyboard.

Devices employing two touch screens are known for example from U.S. Pat. No. 6,331,840, and which can comprise a device exhibiting a folding housing or otherwise. The device of this document provides for the possibility of "cutting and pasting" or "copying and pasting" an object displayed on one screen across to the other screen.

However, when processing of the content requires more than the mere movement of an object from one screen to another, arrangements such as those known from the above document are disadvantageously limited. In particular, such known devices contain no disclosure, nor make any suggestion, as to how content effectively overlapping the two screens might be manipulated and processed.

DISCLOSURE OF INVENTION

The present invention seeks to provide for a touch sensitive device, employing two or more touch screens, and related method of operation, having advantages over such devices and methods.

The invention further seeks to provide for such a device and method arranged for manipulating/processing content overlapping at least two screens and in particular in a user-friendly and efficient manner.

According to a first aspect of the present invention, there is provided a touch-sensitive electronic device having at least first and second touch screens, interface control means for touch selection of content displayed on the screens, the interface control means being arranged such that as touch-selection on the first screen reaches an end location, the touch-selection functionality is arranged to continue at a start location on the second screen, to allow for touch selection of content extending across both screens.

Advantageously therefore, a user can readily select content extending across two, or indeed more, screens for subsequent processing purposes, whether copy, cut, highlight or otherwise etc.

The fact that such content extends beyond a single screen does not therefore disadvantageously limit the manner in which the user can process or in any way adapt that content.

Standard content processing functionality can therefore be employed, in a single action, irrespective of the fact that the content extends to overlap between two or more screens.

According to one arrangement, the end location on the first screen can comprise a screen location represented by an upper or lower corner region of the displayed content.

Likewise, the start location on the second screen can comprise a screen location represented by an upper or lower corner region of the displayed content.

Alternatively, rather than a location represented by the displayed content, said start and/or end locations on either of the screens can comprise either upper or lower corner regions or the perimeter of the touch screen.

Thus, the point at which the touch-selection functionality is arranged to continue on the second screen can be determined either by the screen perimeter, or the location of an end/start point of the displayed content, and in particular content type such as text or graphic for example.

Such variety of possibilities allows for the functionality of the invention to be achieved irrespective of whether content extending across the at least two screens is to be selected in a right-left, left-right, up-down, or down-up manner. The content of interest can therefore be selected in either a forwards or backwards mode. This advantageously allows for adoption of the invention irrespective of the characteristics of the content such as language or otherwise.

Further, the interface control means can be arranged to drive the display element indicating that the end location has been reached.

In this manner, the user is then readily informed that content bridging two or more screens can be selected in accordance with the present invention.

Advantageously, the display element can comprise a split cursor with respective portions appearing at the end and start locations of the respect screens.

The split cursor can advantageously be arranged such that, upon being moved/dragged on the screen, either of the two portions can revert to an appearance of a single unitary cursor.

Advantageously, the split cursor can comprise two portions including respective arrows pointing in opposite directions. Also, the single cursor can comprise a single arrow pointing in the direction moved by the user.

Preferably, the portion of selected content is highlighted for ease of recognition and such highlighting continues onto the second screen as appropriate. A functionally-single highlighted portion of content is then readily generated in a simple and quick manner for subsequent processing/manipulation as required.

Of course, the touch-sensitive device can comprise any form of device having multiple screens, provided in any appropriate configuration, and offering one or more of computing/processing, organizing and/or communications functionality.

According to another aspect of the present invention, there is provided a method of touch-selection of content displayed on first and second touch-screens of a touch-sensitive electronic device, wherein as touch-selection on the first screen reaches an end location, that selection is saved directly or indirectly by the device, and touch-selection functionality continues at a start location on the second screen, so as to achieve touch-selection of content extending across both screens.

As above, the end location on the first screen can comprise a screen location represented by and upper or lower corner region of the displayed content.

Likewise, the start location on the second screen can comprise a screen location represented by an upper or lower corner region of the displayed content.

Again, rather than a location represented by the displayed content, the method can employ end and start locations on either of the screens that can comprise either upper or lower corner, or perimeter regions, of the touch screens.

The method of the invention can then be employed irrespective of whether content extending across the at least two screens is to be selected in a right-left, left-right, up-down, or down-up manner. The content of interest can therefore be selected in either a forwards or backwards mode and so be readily adapted for use with different format, configuration and language of content etc.

Further, the control means can be arranged to drive the display element indicating that the end location has been reached.

In this manner, the user is then readily informed that content bridging two or more screens can be selected in accordance with the present invention.

As above, the display element can comprise a split cursor with respective portions appearing at the end and start locations of each screen.

The split cursor can advantageously be arranged such that, upon being touched and moved, either of the two portions can revert in appearance to that of a single cursor.

Advantageously, the split cursor can comprise two portions including respective arrows pointing in opposite directions. Also, the single cursor can comprise a single arrow pointing in the direction moved by the user.

Preferably, the portion of selected content is highlighted for ease of recognition and such highlighting continues on to the second screen as appropriate. A functionally-single highlighted portion of content is then readily generated in a simple and quick manner for subsequent processing/manipulation as required.

BRIEF DESCRIPTION OF THE DRAWINGS

The invention is described further hereinafter, by way of the example only, and with reference to the following drawings in which.

EMBODIMENTS FOR CARRYING OUT THE INVENTION

Figure 1:
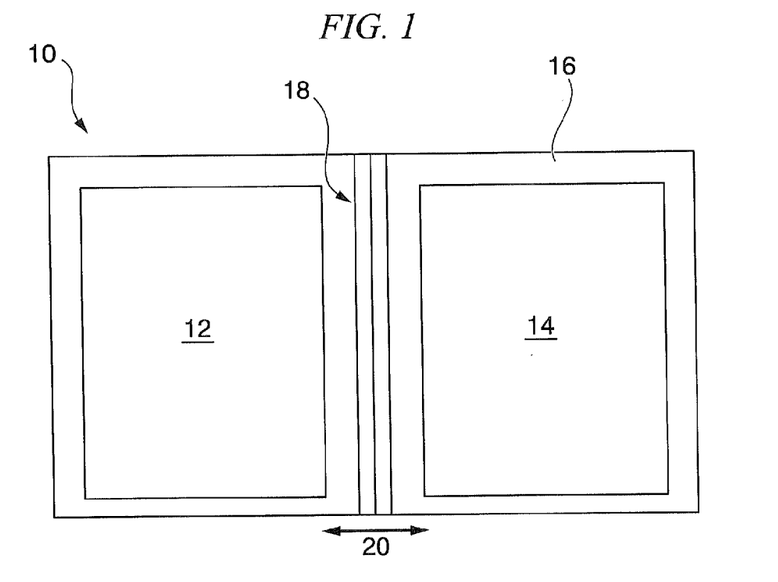
FIG. 1 is a plan view of the touch-sensitive electronic device in the form of a notebook computing device according to an embodiment of the present invention.

Turning first to FIG. 1, there is provided a plan view of a touch-sensitive electronic device embodying the present invention and in the form of a notebook computer device 10. As will be appreciated from the above, the present invention is directed to multi-touch screen devices having at least two touch screens and the illustrated example in FIG. 1 comprises two touch screens 12 and 14 mounted within a foldable housing 16. Each of the two leaves of the housing 16 carrying the respective displays 12 and 14 is foldable between open and closed configurations by way of a hinge arrangement 18.

It should further be appreciated that, in the illustrated example, the two touch screens 12, 14 are discrete elements separated by the hinge arrangement 18 which also forms a region 20 of functional discontinuity between the two screens 12 and 14.

However, it should also be appreciated that the present invention is in no way limited to such screen configurations. For example, the invention is equally applicable to a touch-display arrangement employing at least two display screens which nevertheless offer the appearance of a single screen, and which can be provided under a single uniform screen layer of unitary appearance. Also a device employing any appropriate number of screens, whether foldable or otherwise, and any appropriate dimensions, can also embody the present invention and irrespective of the layout and configuration of the screens.

As will be appreciated from the drawings and further discussion below, a particular aspect of the present invention is the selection and processing of content, in a unitary manner, that stretches over two, or indeed more, screens.

Figure 2:
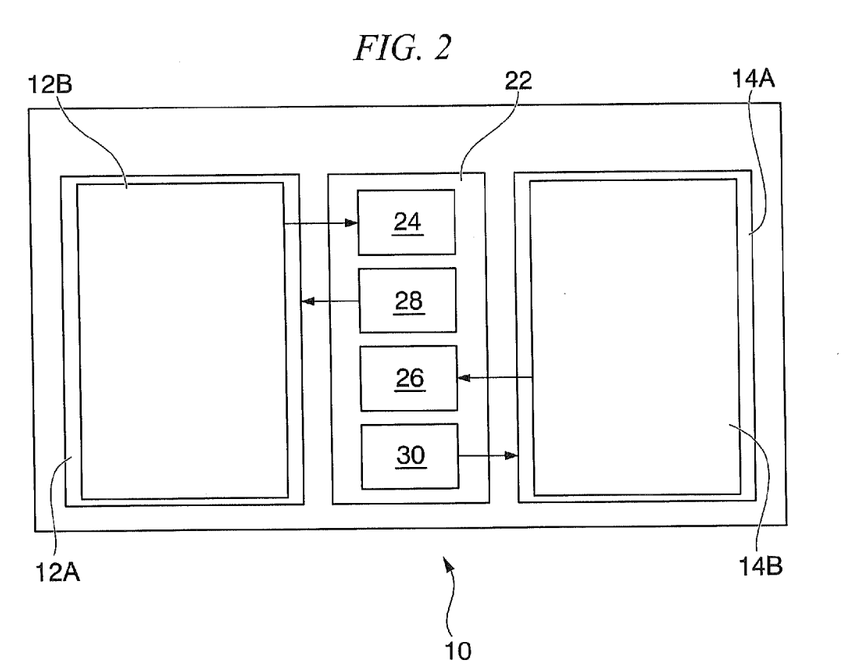
FIG. 2 is a schematic plan view of the functional elements of the device or FIG. 1.

Remaining with the embodiment as illustrated in FIG. 1, reference is now made to FIG. 2 which comprises a schematic illustration of the operational functionality of the computing device 10 of FIG. 1.

As illustrated, each of the touch screens 12 and 14 comprises overlapping display 12A and 14A and touch-sensitive 12B and 14B elements respectively and which employ aspects of standard touch-screen functionality not discussed in further detail here. A main processing system 22 of the device 10 comprises respective memory and processing subsystems 24-30 for each of the two screens 12 and 14. In further detail, a touch-sensitive memory and processing subsystem 24 is provided for the screen 12, and a touch-sensitive memory and processing subsystem 26 is provided for the screen 14. Likewise, a display memory and processing subsystem 28 is provided for screen 12, and a display memory and processing subsystem 30 is provided for screen 14.

Much of the core functionality of the subsystems 24-30 is standard and not discussed any further detail here except for confirmation that user-interface with the device 10 is readily achieved, in a touch-sensitive manner, for selecting and processing content as displayed on the screens 12 and 14 and as required. As will be appreciated from your further discussion below, such processing can comprise standard actions such as, "cut and paste", "copy and paste" or mere deletion or highlighting as required but is in no way limited to such actions. That is, with content displayed on display 12, user selection of at least a portion of that content can be made by touching the screen with a finger and dragging the finger across the screen 12. Such selection is stored/buffered within the touch-screen processing subsystem 24, while the selection of that at least part of the displayed content, is mirrored by appropriate adaption of the display, such as highlighting the selected portion, by means of the display processing subsystem 28. The user can then readily determine that part of the content that has been selected for further manipulation/processing. Such functionality is likewise provided for the second screen 14 and by way of the touch screen subsystem 26 and the display screen subsystem 30.

It is an important aspect of the present invention, the content as displayed on both screens 12 and 14 can be selected and processed in a simple and unitary manner, and generally in a manner no more complex than the collection and processing of content on just one of the screens 12 and 14.

The present invention seeks to provide such advantageous operation through specific functionality of the processing system 22. One particular example is described further hereinafter with initial reference to FIGS. 3A-3C and the manipulation of a portion of text spanning both screens 12 and 14; each of which seeks to display the content as if it were a page of the document.

Figure 3A:
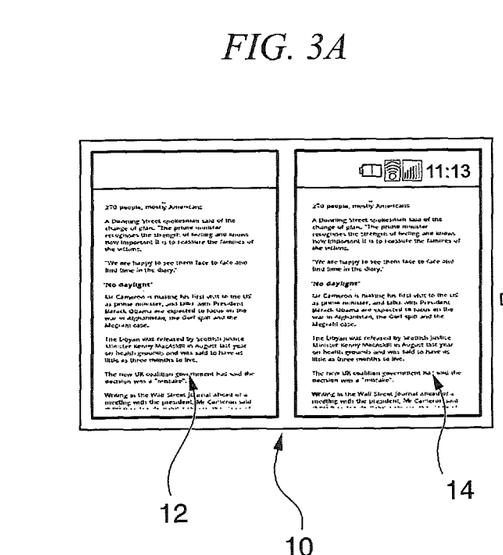
FIGS. 3A-3C show examples of screen content appearing during implementation of an embodiment of the present invention.

Turning first to FIG. 3A, there is shown a schematic illustration of a dual screen device 10 such as that of FIG. 1 and employing two touch-sensitive screens 12 and 14. The display offered by the two screens 12 and 14 can be separated by way of a physical discontinuity such as a hinge portion as discussed above; or can present a single surface under which two screens are located. The schematic representation of FIGS. 3A-3C; and also FIGS. 4A-4C is intended to encompass all such arrangements.

As illustrated in FIG. 3A, a page of continuous text is displayed on each screen 12 and 14 respectively and, in accordance with the invention, a user seeks to process/manipulate a required portion of the text irrespective of the fact that it spans both screens 12 and 14.

Figure 3B:
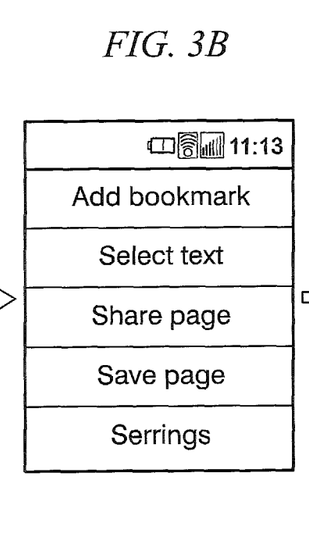

The functionality offered by way of the present invention can be accessed in a standard manner, by way of a drop-down menu, such as illustrated in FIG. 3B and in which a "Select text" option is available. Having selected this option, a touch-and-drag motion can be executed by a user's finger to select the requisites portion of text which, as selected, appears highlighted on the screen. Such operation is illustrated with reference to FIG. 3C in which a user's finger 32 has touched the screen 12 at a first location 34 and then dragged across and downwardly to a second location 36. This produces the highlighted block of text 38 as illustrated.

Figure 3C:
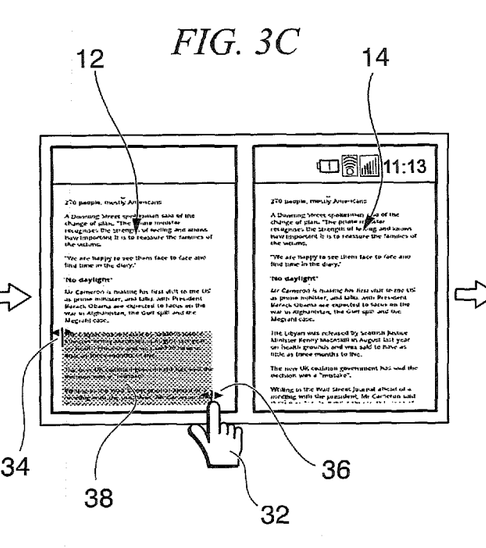
Figure 4A:
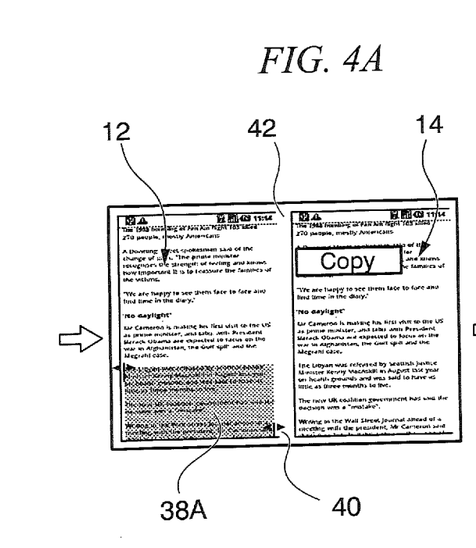
FIGS. 4A-4C show further examples of screen content appearing during implementation of an embodiment of the present invention.
Figure 4B:
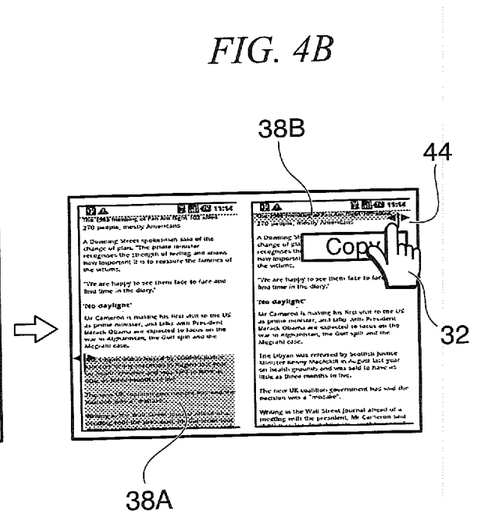
Figure 4C:
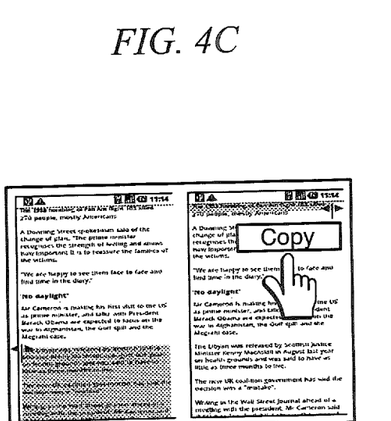

As is discussed in further detail below, the point 34 at which the highlighted block of text 38 commences is marked by way of a movable cursor and, likewise, the point 36 at which the highlighted block of text 38 ends is marked by way of a similar cursor. In the illustrated examples of the application, the cursors comprise representations of oppositely-pointing pairs of arrows which can be split, and re-combined, as appropriate and required and as discussed further below.

As the point 36 at which the highlighted block of text 38 ends approaches a so-called "end location" on the display 12, an important feature of functionality of the device embodying the present invention continues as discussed further below. It should first be noted however that by "end location" is meant any location that can comprise either an edge/end location of the content being displayed at any particular time on a screen, whether text or otherwise; and/or an actual edge perimeter of the touch sensitive screen irrespective of whether the pixels associated with that location are actually displaying parts of the image. The content being displayed can also comprise a content type, such as text as compared with an image. Thus the end of the portion of text, albeit not necessarily near the bottom of the screen can comprise the "end location".

In any case, as the selected/highlighted portion of text reaches that "end location" the cursor splits in two so as to confirm that the touch-selectivity can now continue on the second screen 14. The selected portion, or the coordinates of the beginning and end of that selected portion, is/are saved at this stage.

Referring now to FIG. 4A, specific reference is made to the split cursor 40 and 42 comprising a first element 40 pointing in the backwards direction of the text and located at the "end location" of the display 12, and a second element 42 pointing in the forwards direction of the text, and located at a "start location" at the top left of the second screen 14. Again, and the "start location" associated with the second screen 14 can comprise either the location of the start of the displayed image/text as appropriate, or the top left perimeter of the touch sensitive screen 14. Whichever option is employed, the appearance of the forward facing element 42 of the split cursor indicates that text appearing on the second screen 14 can now be selected by way of a repeated touch-and-track operation by the user's finger 32 so as to extend the highlighted block 38 of text across both screens 12 and 14 and to therefore form effectively a continuous block of text comprising a lower portion 38A of the text on the first screen 12, and an upper portion 38B of the text on the second screen 14.

The formation of such portions is illustrated with reference to FIG. 4B. This figure illustrates also that once the selection of text has continued on to the content of the second screen 14, the split cursor recombines into a unitary element comprising the oppositely-facing arrow elements. Such an element serves to confirm for the user that the portion of text being selected on the second screen 14 can be increased/reduced as required by way of an ongoing dragging motion in a forwards or backwards direction as required.

As also illustrated in FIGS. 4A-4C, once a "Select text" option has been chosen, one of a variety of other processing options such as "cut" or "copy" can be selected in a standard manner. Whichever is chosen, an appropriate pop-up button is displayed on one of the two screens 12 and 14, and at an appropriate location, for subsequent touch-selection by the user when the required processing step is to be taken. Thus, with specific reference to FIG. 4C, the touch-selection of a portion of text overlapping the two screens 12 and 14 has been completed and that unitary portion 38A and 38B (see FIG. 4B) of text can be saved to the device's clipboard through touch-selection of the "Copy" button illustrated.

The appropriate location within the remainder of the text at which the selected portion is to be copied can then be selected in the usual manner.

As will therefore be appreciated, the present invention advantageously allows for a simple and efficient mechanism for selecting content that extends across two or more screens of a multi-screen device and which advantageously allows for a user to remove their finger from one touch screen as required and in order to continue selection of content appearing on another discrete screen.

While the above description employing reference to FIGS. 3A-3C; and FIGS. 4A-4C, relates to ongoing selection of text in a "forward" direction, it should of course be appreciated that the invention allows equally for selection in a "backwards" direction. That is, a portion of text might first be selected on the upper region of the display 14 by way of a touch-and-drag motion in a backwards direction such that when the selection coincides with the "start location" at the upper-left of the screen 14, e.g. the content displayed thereon, the above-mentioned split-cursor appears with a backwards-pointing arrow appearing at the bottom right of the screen 12.

As will of course be appreciated, such functionality of the present invention is achieved by way of the touch sensitive subsystem 24 and display processing subsystem 28; and the touch sensitive subsystem 26 and the display processing subsystem 30 associated with each of the touch screens 12 and 14 respectively. While such subsystems employ touch-selection-display functionality having aspects that are common in the art, a further level of process control is provided within the main processing system 22 so as to allow for the ongoing touch-sensitivity from one screen to another and the generation of any required user-interface elements such as the split-cursor arrangement discussed above.

Although the illustrated example employs an end location generally at the bottom right of the text content/screen, this is in no way limiting and the end location could be found bottom left, top right or indeed top left dependent upon the characteristics of the content such as language. Also, the end location can comprise an end location of a content type such as text or graphic which renders the invention appropriate for mixed content displays. While the split-cursor arrangement comprises just one form of user-interface elements that can be employed within the present invention, further details are provided by reference to FIGS. 5 and 6.

Figure 5:
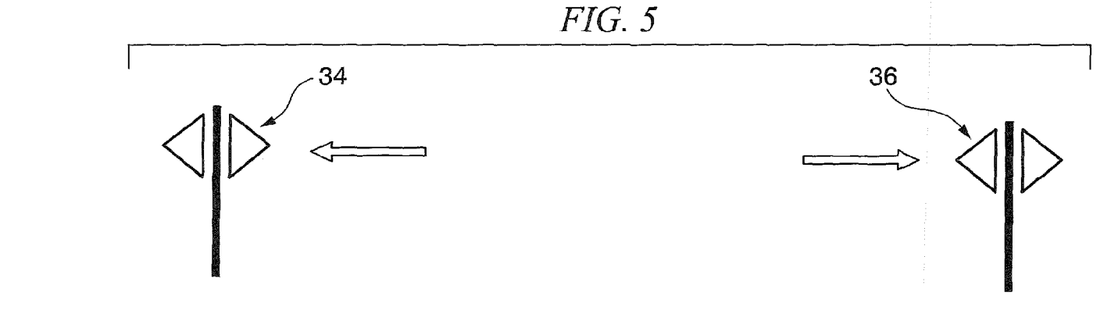
FIG. 5 shows examples of a cursor image generated according to an embodiment of the invention.

Turning first to FIG. 5, there are provided illustrations of the two cursors found at the start and end points at which the initial selected block of text 38 appears in FIG. 3C. Both of the left and right cursors as appearing at these locations 34 and 36 are illustrated, and with slight differences in shading to distinguish the two. Since, at that time, the selected text is not crossing a screen boundary, each of the two cursors is shown in a unitary i.e. non-split, configuration. This serves to confirm for the user that the cursor, and thus the associated limit of the selected content, can be moved in either direction, i.e. backwards or forwards.

Figure 6:
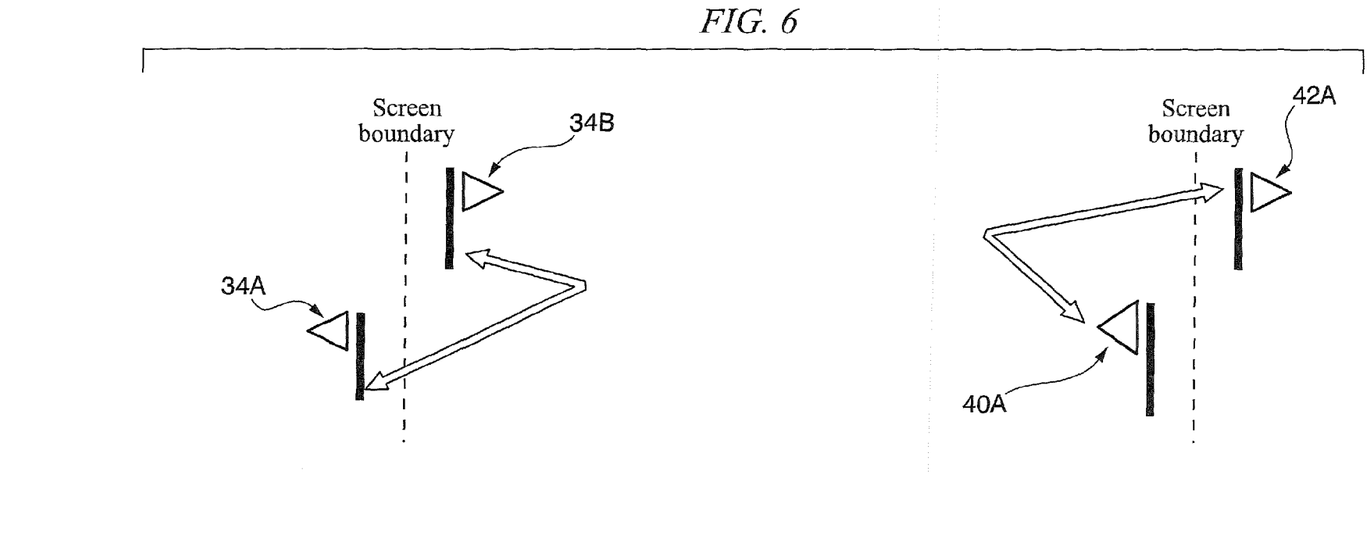
FIG. 6 shows further detail of the cursor images of FIG. 5.

Turning now to FIG. 6 however, each of the two unitary cursors of FIG. 5 shown in split formats comprises two separate elements 34A and 34B; and 40A and 42A, respectively. In this illustrated example, the split-cursor configuration is formed at the time the unitary cursor configuration of FIG. 5 reaches the screen boundary/perimeter as indicated in FIG. 6. The appearance of the split-cursor 34A and 34B; 40A and 42A in this manner serves to indicate that the selection of the content can continue in a manner expanding a unitary block of selected content irrespective of the fact that the boundary/perimeter of the screen has been reached.

The functionality is further arranged such that as the user drags one of the elements of the split cursor away from the boundary/perimeter, the cursor returns to its unity form such as illustrated in FIG. 5. Of course, depending upon which of the split cursor elements is being moved, such movement away from the boundary will serve to enlarge, or reduce, the size of the portion of content being selected.

Figure 7:
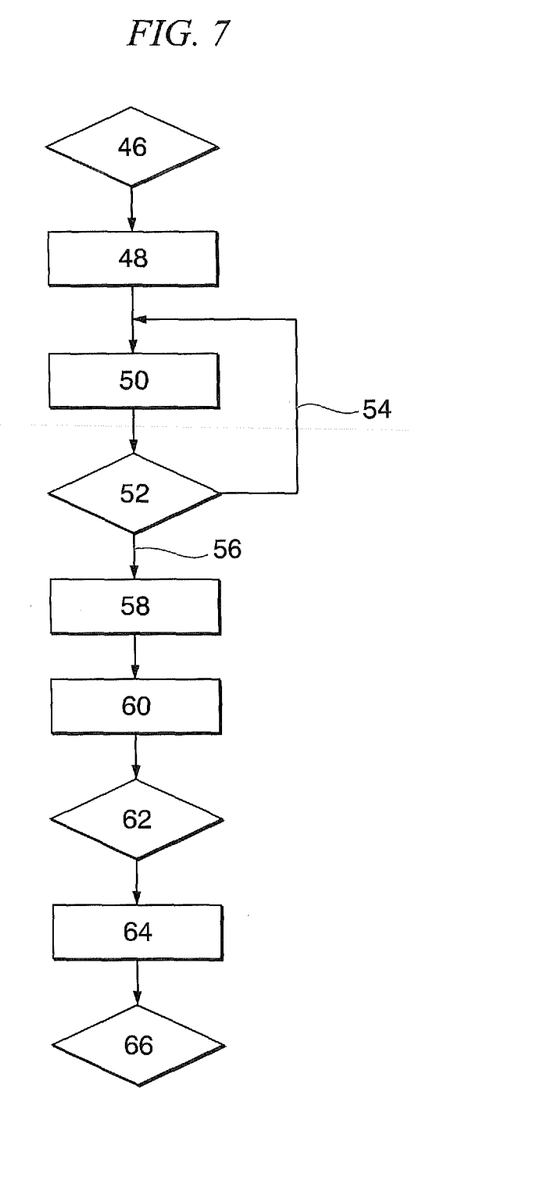
FIG. 7 is a flow diagram illustrating the steps of a method embodying the present invention.

To clarify further the visually simple and efficient operation of content-selection within the multi-screen environment offered by way of the present invention, reference is now made to FIG. 7 which comprises a flow diagram illustrating an example of the methodology embodied within the present invention and relating to the selection of a block of text such as discussed above.

Starting at step 46, it is first determined whether or not a "Select text" option has been chosen and if so the process continues to step 48 where the location of an initial touch by the user on the first screen is determined and displayed by means of a cursor interface element. At step 50, an ongoing dragging motion of the user's finger across the screen is determined and the related block of text highlighted in an ongoing manner. Such highlighting selection continues until such time as the user's finger is removed from the screen or it is determined that a so-called "start location" on the first screen 12 has been reached. The determination of this latter question occurs at 52 and if the ongoing dragging action is not found yet to coincide with the "start location", the procedure continues via 54 hack to step 50.

If, however, it is found at 52 that the selected portion of text does now coincide with the "start location", the procedure continues to step 50 when touch-selection can continue on the second screen and, at 60, a user-interface illustration of such possibility is provided to the user (i.e. the appearance of the split-cursor as discussed above).

At step 62, it is then determined whether the split cursor appearing on the second screen is dragged further in a touch-selective manner. If so, the procedure continues to step 64 allowing for the touch selection and highlighting of a portion of text to continue on the second screen, and the adaption of the user-interface illustration, i.e. the return of the split-cursor to a unitary format as discussed above, which serves to confirm this.

Finally, at step 26 it is determined whether the touch selection procedure has been completed and a processing "action step", e.g. "cut" or "copy" selected in relation to the portion of text.

It should of course be appreciated that the invention is in no way limited to any particular content displayed or any particular processing step/function to be employed. Also while touch functionality primarily employing a user's digit has been described above, the invention can be applied in relation to any form of touch screen/tablet arrangement whether requiring use of a specific touch implement, e.g., a stylus, or otherwise. Further, the device can exhibit any appropriate number and configuration of screens whether horizontally or vertically adjacent, or a combination thereof, and such that said end and start locations are adapted accordingly.

Also, with content extending over, for example first, second and third screens, the start location can be provided on both the second and third screens such that the user then has the option of continuing the content selection on either of those screens. If the start location on the third screen is chosen, the content on the intermediate, i.e. second screen, can be selected in full so that the unitary selected portion extends over the first, second and third screens.

The invention claimed is:

1. A touch-sensitive electronic device, comprising:
   at least first and second touch screens; and
   interface control means for touch selection of a content displayed on the screens, the interface control means being arranged such that as touch-selection on the first touch screen reaches an end location, the touch-selection functionality is arranged to continue at a start location on the second touch screen, to allow for touch selection of content extending across said first and second screens,
   wherein the interface control means is arranged to drive a display element indicating that the end location has been reached,
   wherein the display element comprises a split cursor formed when the end location is reached and with respective portions appearing at the end and start locations of each screen, and
   wherein the split cursor includes first and second elements, the first and second elements being unitary when the split cursor does not cross a screen boundary between the first and second screens, and the first and second elements being separated to be displayed on the first and second screens, respectively, when the split cursor reaches the screen boundary.

2. A device as claimed in claim 1, wherein the device is arranged such that the end location on the first screen comprises a screen location represented by an upper or lower corner region of the displayed content.

3. A device as claimed in claim 1, wherein the start location on the second screen comprises a screen location represented by an upper or lower corner region of the displayed content.

4. A device as claimed in claim 1, wherein the device is arranged such said start and end locations on either of the first or second touch screens comprise one of an upper or a lower corner region of the touch screens.

5. A device as claimed in claim 1, wherein the split cursor comprises two portions including respective indicators facing forwards and backwards.

6. A device as claimed in claim 1, comprising three or more touch screens,
wherein the end location is configured to be provided on any one of the touch screens, and the start location is configured to be provided on at least one of other touch screens.

7. A device as claimed in claim 6, wherein the start location is configured to be provided on a plurality of touch screens offering choice to a user as to where to continue the touch selection.

8. A device as claimed in claim 1, wherein the content to be touch-selected comprises part of a total displayed content of the touch screen.

9. A device as claimed in claim 8, wherein the content to be touch-selected comprises a content type.

10. A device as claimed in claim 9, wherein the content type comprises at least one of text or graphics.

11. A device as claimed in claim 1, wherein, when the first and second elements are unitary, the first element overlaps the second element.

12. A device as claimed in claim 1, wherein, when the split cursor reaches the screen boundary, the first and second elements are displayed on opposing sides of the screen boundary.

13. A device as claimed in claim 12, wherein, when one of the first and second elements of the split cursor is dragged away from the screen boundary, the split cursor returns to a unitary appearance.

14. A method of touch-selection of content displayed on first and second touch-screens of a touch-sensitive electronic device, wherein as touch-selection on the first touch screen reaches an end location, the touch-selection functionality continues at a start location on the second touch screen, so as to achieve touch-selection of a content extending across said first and second touch screens, and wherein the display element comprises a split cursor with respective portions appearing at the end and start locations of the first and second screens, the method comprising:
arranging the split cursor to include first and second elements;
displaying the first and second elements unitary when the split cursor does not cross a screen boundary between the first and second screens; and
displaying the first and second elements split on the first and second screens, respectively, when the split cursor reaches the screen boundary.

15. A method as claimed in claim 14, wherein the end location on the first touch screen comprises a screen location represented by upper or lower corner regions of the displayed content.

16. A method as claimed in claim 14, wherein the start location on the second touch screen comprises a screen location represented by upper or lower corner regions of the displayed content.

17. A method as claimed in claim 14, wherein the end or start locations on either of the touch screens that is configured to comprise either upper or lower corner regions, or a perimeter region of each touch screen respectively.

18. A method as claimed in claim 17, wherein touch-selection at a start location on a third touch screen incorporates a content on the second touch screen into the selection.

19. A method as claimed in claim 14 wherein, upon being touched and moved, the split cursor reverts to a unitary appearance.

20. A method as claimed in claim 14, wherein the device includes three or more touch screens and the touch-selection functionality spans any number of the touch screens.

21. A method as claimed in claim 14, wherein the content to be selected comprises one of a content type text and content type graphics.

* * * * *